(12) United States Patent  
Sasaki et al.

(10) Patent No.: US 6,512,653 B1  
(45) Date of Patent: Jan. 28, 2003

(54) CASSETTE CHANGER

(75) Inventors: Kenji Sasaki, Kyoto (JP); Tetsuya Morita, Hirakata (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/555,023

(22) PCT Filed: Nov. 24, 1998

(86) PCT No.: PCT/JP98/05287

§ 371 (c)(1),  
(2), (4) Date: Jun. 27, 2000

(87) PCT Pub. No.: WO99/28907

PCT Pub. Date: Jun. 10, 1999

(30) Foreign Application Priority Data

Nov. 27, 1997 (JP) .............................. 9-325086

(51) Int. Cl.[7] ................................ G11B 5/48
(52) U.S. Cl. .................. 360/92; 369/178.01
(58) Field of Search ............. 369/69, 96, 178.01, 369/177, 218; 360/92, 69, 93, 94

(56) References Cited

U.S. PATENT DOCUMENTS

| | | | | |
|---|---|---|---|---|
| 4,827,463 A | * | 5/1989 | Motoyoshi et al. | 369/30.43 |
| 4,853,916 A | * | 8/1989 | Tomita | 360/98.06 |
| 5,014,255 A | * | 5/1991 | Wanger et al. | 369/30.43 |
| 5,036,503 A | | 7/1991 | Tomita | 369/39 |
| 5,043,962 A | * | 8/1991 | Wanger et al. | 369/195 |
| 5,123,000 A | * | 6/1992 | Fitzgerald et al. | 369/36 |
| 5,402,283 A | | 3/1995 | Yamakawa et al. | 360/92 |
| 5,487,579 A | * | 1/1996 | Woodruff | 249/907 |
| 5,631,785 A | | 5/1997 | Dang et al. | 360/92 |
| 5,659,434 A | * | 8/1997 | Yamakawa et al. | 360/69 |
| 5,691,859 A | | 11/1997 | Ulrich et al. | 369/92 |
| 5,742,570 A | * | 4/1998 | Taki et al. | 369/36 |
| 6,301,218 B1 | * | 10/2001 | Jones | 360/92 |

FOREIGN PATENT DOCUMENTS

| | | |
|---|---|---|
| DE | 23 59 442 | 10/1975 |
| DE | 19607251 A1 | 8/1997 |
| DE | 19708581 A1 | 11/1997 |
| EP | 0709169 A2 | 5/1996 |
| JP | 63-269370 | 11/1988 |
| JP | 1-146157 | 6/1989 |
| JP | 5-342721 | 12/1993 |
| JP | 8-195013 | 7/1996 |
| JP | 09-306081 | 11/1997 |

\* cited by examiner

Primary Examiner—Allen Cao  
Assistant Examiner—Dzung C. Nguyen  
(74) Attorney, Agent, or Firm—Parkhurst & Wendel, L.L.P.

(57) ABSTRACT

A cassette changer which comprises a recording and reproducing unit having an insert and withdrawal port into and from which a groove-carrying cassette can be inserted and withdrawn, and a storage unit adapted to store a plurality of cassettes therein, and which is used to transfer the cassette between the recording and reproducing unit and storage unit, the cassette changer being further provided with a chuck capable of taking a locking position in which the chuck is engaged with the groove of the cassette, and a release position in which the chuck leaves the groove and does not prevent a first transfer unit from moving, a second transfer unit transferring a cassette to a storage position or an insert and withdrawal position and thereafter being allowed to move further, whereby a chuck releasing member engages the chuck, which is thereby moved from the locking position to the release position.

3 Claims, 15 Drawing Sheets

CASSETTE CHANGER

TECHNICAL FIELD

The present invention relates to a cassette changer capable of housing a plurality of tape cassettes for a VCR or the like and sequentially operating these cassettes.

BACKGROUND ART

Various auto cassette changers have been proposed and well known; these cassette changers are principally used for business or broadcasting. Further, various cassette changers have been proposed which comprise a mechanism for chucking a groove formed in a cassette to install or withdraw the cassette, the mechanism being provided in a cassette transporting section for transporting the cassette between a recording and reproducing unit such as a VCR and a cassette storage section. A representative well-known example of such a cassette changer is described in JP-A-9-180329.

The cassette changer described in JP-A-9-180329 has a VCR, a rack acting as a cassette storage section, and a robot hand acting as the cassette transporting section. The robot hand has hooks provided at its right and left positions. Each of the hooks can be freely opened and closed and is urged in a closing direction by means of a first spring. When the hooks are closed, their tip portions engage with the groove of the cassette to enable the cassette to be held. Each hook is provided with a sublever. Each sublever can be freely opened and closed and is urged in a closing direction by means of a second spring.

The VCR has first eject guides each provided at a position corresponding to the hook and having a tapered surface. In addition, the rack has second eject guides each provided on a corresponding side surface thereof at a position corresponding to the sublever.

If a cassette held by the hooks of the robot hand is inserted into the VCR, the insertion causes the first eject guides to open the hooks, thereby disengaging the hooks from the cassette. Then, a pressure section of the robot hand presses the cassette into the VCR.

If the cassette is inserted into the rack, the sublevers abut on the second eject guides to release the hooks from a groove. Then, the cassette is housed in the rack at a predetermined position. In addition, if the cassette is removed from the rack, sublevers are prevented from abutting on the second eject guides, so that the hooks engage with the groove of the cassette instead of being released. Thus, the cassette can be withdrawn.

However, the above well-known cassette changers have the following problems:

A first problem is that the VCR cannot be directly operated without provision of the first eject guides therefor and that in some cases VCR must be substantially changed so as to include the first eject guides.

A second problem is that the rack also requires as many second eject guides as housed cassettes and must thus have a complicated structure.

A third problem is that the cassette changer requires a complicated structure because it cannot operate only with the hooks but requires the sublevers, the first and second springs, and the pressure section or the like.

A fourth problem is that if the robot hand executes movements required to house a cassette in the rack and take out another cassette, then after the housing of the cassette in the rack has been completed, the sublevers must be separated from the second eject guides and then moved to the cassette to be removed next, thereby requiring a large amount of time for cassette change.

DISCLOSURE OF THE INVENTION

It is a first object of the present invention to provide a cassette changer that can reliably change cassettes without the need to modify a VCR.

It is a second object of the present invention to provide a cassette changer having such a simple configuration as to eliminate the needs for sublevers, first and second springs, a pressure section, and second eject guides provided for each corresponding rack.

It is a third object of the present invention to provide a cassette changer that can be moved, immediately after a cassette has been housed in a rack, to another cassette to be removed next, thereby reducing the time required to change the cassettes.

To attain these objects, a cassette changer according to the present invention which comprises a recording and reproducing unit having an insert and withdrawal port and from which a groove-carrying cassette can be inserted and withdrawn, and a storage unit adapted to store a plurality of cassettes therein, and which is used to transfer the cassette between the recording and reproducing unit and storage unit, further comprises:

a first transfer unit for transferring the cassette between a first position from which the cassette can be transferred to the insert and withdrawal port of the recording and reproducing unit and a second position from which the cassette can be transferred to the storage unit;

a second transfer unit mounted on the first transfer unit for transferring the cassette between a movable position that does not hinder movement of the first transfer device and a storage position at which the cassette is housed in the storage unit or an insert and withdrawal position at which the cassette is inserted into or withdrawn from the insert and withdrawal port formed in the recording and reproducing unit;

a chuck mounted on the second transfer unit and which is capable of assuming a locking position in which it engages with the groove of the cassette to hold the cassette and a release position in which it leaves the groove of the cassette and does not hinder the first transfer means from moving; and a chuck releasing member provided on the first transfer unit and allowing the second transfer unit to transfer the cassette to the storage or insert and withdrawal position and further move to abut on the chuck member to move it from the locking position to the release position.

Thus, the present invention has the following effects:

First, since operations can be completed only by the cassette transfer section, no changes need be made to the recording and reproducing unit, thereby enabling an totally inexpensive cassette changer to be realized.

Second, the first transfer unit has the chuck release member and the transfer operation performed by the second transfer unit enables cassette transfer and chuck releasing to be carried out, so that the first transfer unit can transfer the cassette immediately after the cassette has been housed in the storage unit, thereby reducing the time required to change cassettes.

According to a preferred embodiment of the present invention, the chuck comprises a groove engaging section that can engage with the groove of the cassette and an abutting section that can abut on one side surface of the cassette, and can assume, in addition to the locking and release positions, a push-in position in which the abutting section can abut on the one side surface of the cassette to push it into the storage unit or the insert and withdrawal port of the recording and reproducing unit. In addition, the chuck release member moves the chuck from the release position to the push-in position when the second transfer unit moves after the second transfer unit moves the chuck from the locking position to the release position.

With this embodiment, the transfer operation performed by the second transfer unit enables the performance of the cassette transfer operation, the chuck releasing operation, and the push-in operation. Accordingly, the chuck and the storage unit can be implemented using very simple configurations, thereby realizing an inexpensive cassette changer.

According to another preferred embodiment, the groove engaging section and the abutting section of the chuck are formed of an identical part. With such a configuration, the cassette can be inserted into the cassette storage unit or the recording and reproducing unit using a more simple arrangement.

BEST MODE FOR CARRYING OUT THE INVENTION (First Embodiment)

Figure 1:
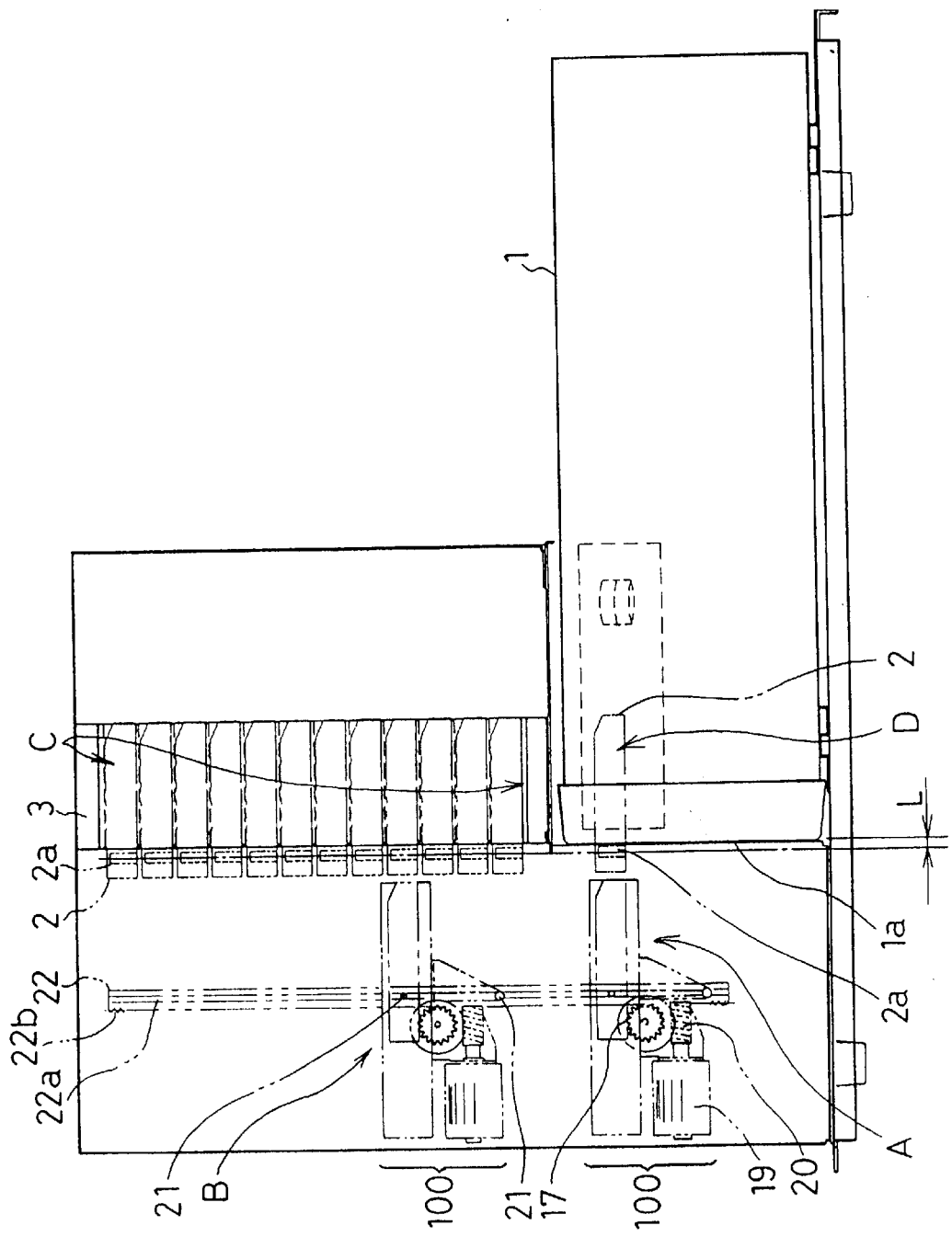
FIG. 1 is a side view of essential parts of a cassette changer according to a first embodiment of the present invention.
Figure 2:
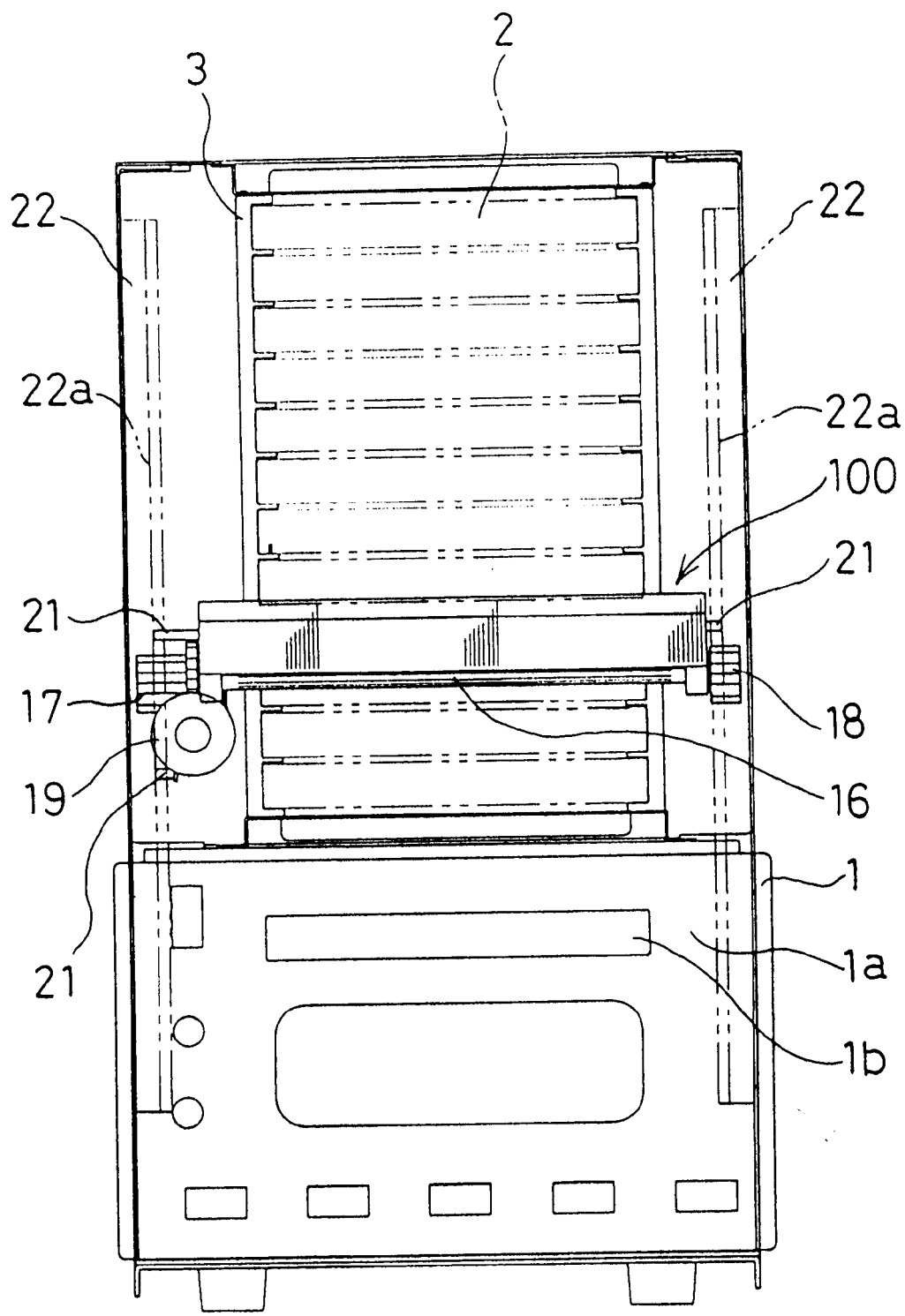
FIG. 2 is a front view of essential parts of the cassette changer in FIG. 1.

Essential parts of the entire cassette changer according to an embodiment of the present invention will be described with reference to FIGS. 1 and 2. A recording and reproducing unit (hereafter referred to as a "VCR") 1 records and reproduces signals on and from a tape (not shown) housed in a cassette 2, and has an insert and withdrawal port 1b formed in its front surface 1a and through which the cassette 2 is inserted and withdrawn. A cassette storage unit 3 is provided to store a plurality of cassette 2. As described later in detail, the cassette storage unit 3 is provided at such a position that a groove 2a in a cassette 2 housed in the cassette storage unit 3 and a groove 2a in another cassette 2 that has been ejected to an insert and withdrawal port 1b in the VCR 1 are both located at a substantially equal distance L from a front surface 1a of the VCR 1.

Reference numeral 100 denotes a vertical transfer unit for transferring the cassette 2 between a position (first position) A that does not hinder movement of the transfer unit 100 and from which the cassette 2 can be transferred to the insert and withdrawal port 1b of the VCR 1 and a position (second position) B that does not hinder movement of the transfer unit 100 and from which the cassette 2 can be transferred to the cassette storage unit 3. The transfer unit 100 internally has horizontal transfer units 110 (FIGS. 3, 4, and 5) for transferring the cassette 2 between a position (movable position) B that does not hinder vertical movement of the transfer unit 100 and a storage position C at which the cassette 2 is stored in the cassette storage unit 3, and between the position (movable position) A that does not hinder vertical movement of the transfer unit 100 and an insert and withdrawal position D corresponding to the insert and withdrawal port 1b of the VCR 1.

Figure 3:
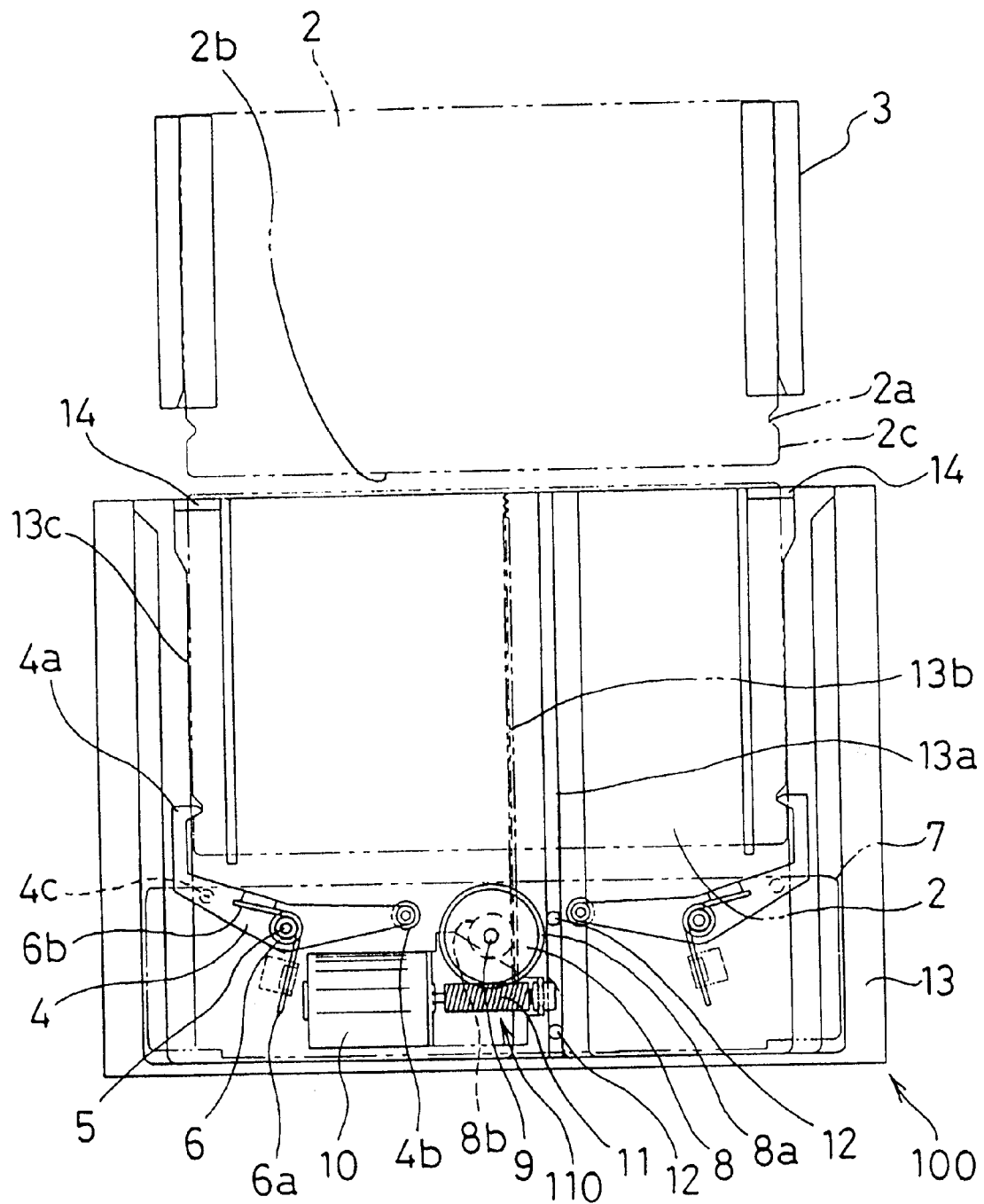
FIG. 3 is an enlarged top view of essential parts of the cassette changer in FIG. 1.
Figure 4:
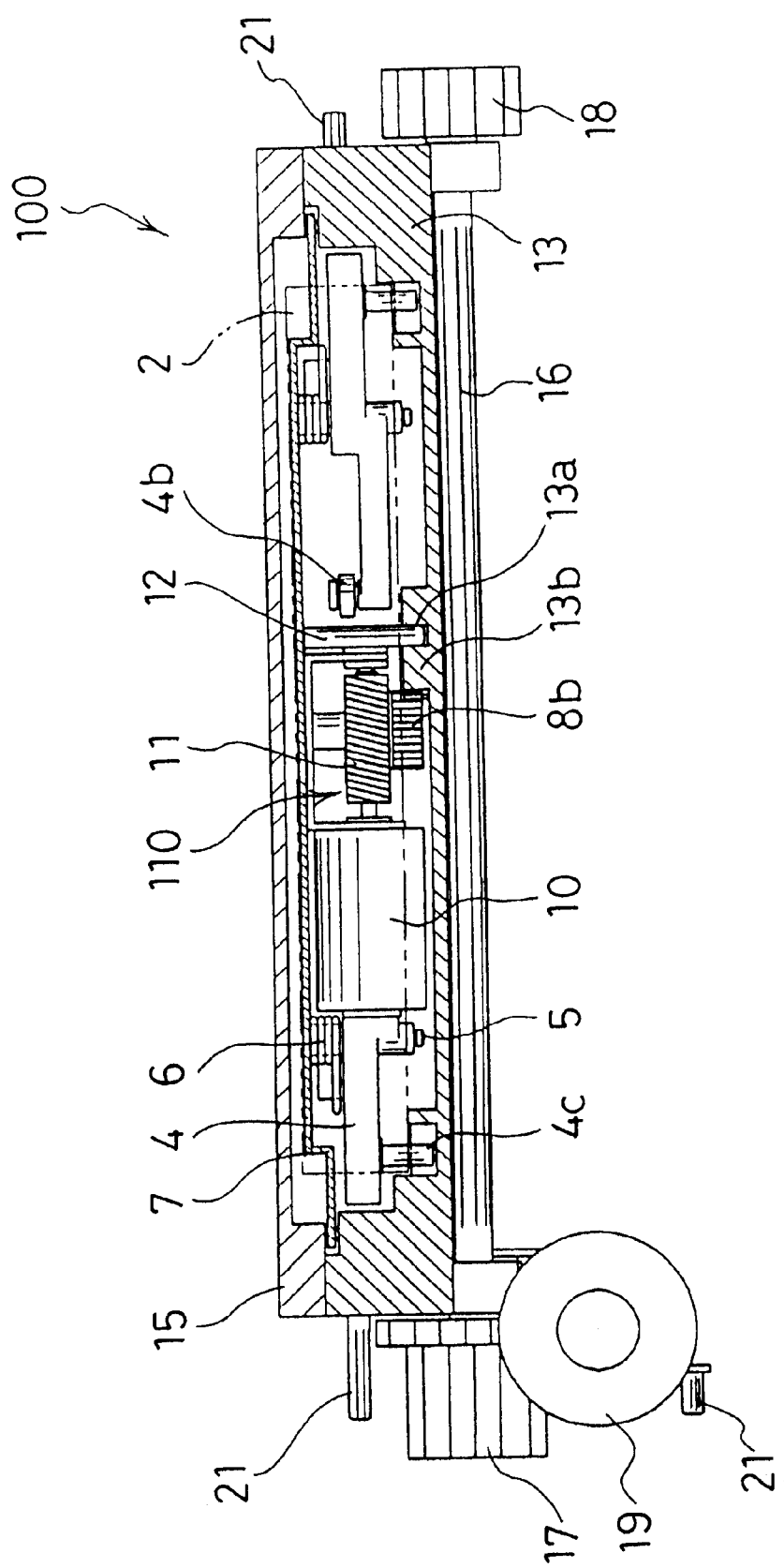
FIG. 4 is an enlarged front view of essential parts of the cassette changer in FIG. 1.
Figure 5:
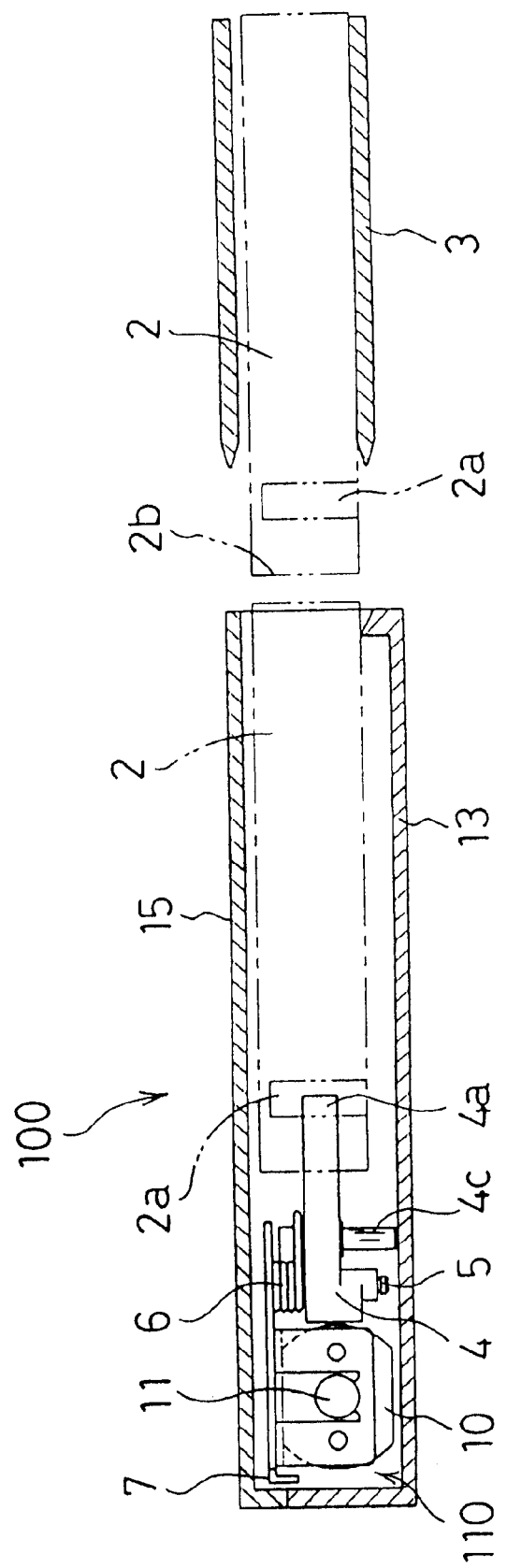
FIG. 5 is an enlarged side view of essential parts of the cassette changer in FIG. 1.

Next, the configuration of essential parts will be described with reference to FIGS. 3, 4, and 5. Components that are laterally symmetrical, as clearly seen from the figures, carry the same reference numerals and only one of the symmetrical pair will be explained. In the vertical transfer unit 100, reference numeral 4 denotes a chuck comprised of a rotating hook having a groove engaging section 4a that can engage with the groove 2a of the cassette 2, an abutting section 4b of a roller structure which can abut on a rear surface 2b of the cassette 2, and a projecting section 4c of a pin structure. The chuck 4 can be rotated around a support shaft 5. Reference numeral 6 denotes a chuck spring comprised of a torsion coil spring and having one end 6a engaging with a moving sheet metal 7 and the other end 6b engaging with the chuck 4 to urge the chuck 4 in such a manner that the groove engaging section 4a engages with the groove 2a of the cassette 2.

Reference numeral 8 is a rotating gear constructed such that a worm wheel 8a and a drive gear 8b are integrally rotated; the rotating gear 8 is provided for rotation around a support shaft 9. Reference numeral 10 denotes a motor, and an output of the motor 10 is transmitted to the worm wheel 8a of the rotating gear 8 via a worm 11. A guide pin 12 projecting downward from the moving sheet metal 7 is inserted into a guide groove 13a in a lower base 13. The moving sheet metal 7, the motor 10, the worm 11, the rotating gear 8, and the guide pin 12 constitute the horizontal transfer unit 110.

Next, the vertical transfer unit 100 will be described in detail. In addition to the guide groove 13a with the guide pin 12 inserted therein to, the lower base 13 has a rack 13b meshing with the drive gear 8*b*, a cassette guide 13*c* that guides a side surface of the cassette 2, and a chuck releasing member 14 that can abut on the downward projecting section 4*c* of the chuck 4.

Since the moving sheet plate 7 is sandwiched between an upper base 15 and the lower base 13, the horizontal transfer unit 110 has been guided in a height direction. The lower base 13 has a left drive gear 17 and a right drive gear 18 rotatably attached thereto and connected together via a synchronous shaft 16 extending in a horizontal direction. Reference numeral 19 denotes a motor, and an output of the motor 19 is transmitted to the left drive gear 17 via a worm 20, which is shown in FIG. 1. Reference numeral 21 is a horizontal guide pin that is guided into guide grooves 22*a* in rack units 22 (FIGS. 1 and 2) provided in the right and left of the cassette changer. The rack units 22 have racks 22*b* that mesh with the left drive gear 17 and the right drive gear 18. The upper base 15, the lower base 13, the synchronous shaft 16, the left drive gear 17, the right drive gear 18, the motor 19, the worm 20, and the guide pin 21 constitute the vertical transfer unit 100.

Figure 7:
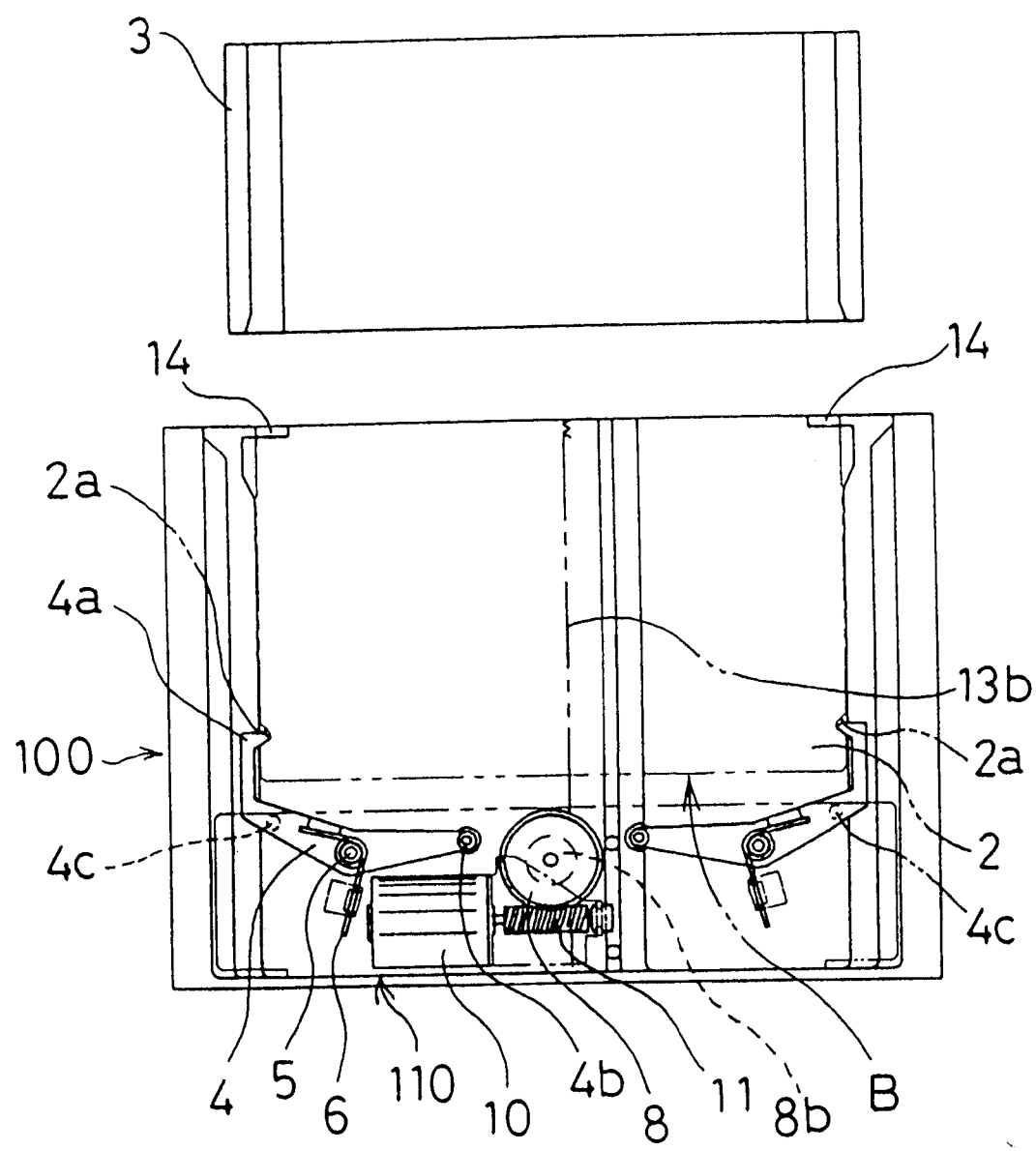
FIG. 7 is a diagram useful in explaining an operation of housing and removing a cassette in and from a cassette storage section of the cassette changer.

Next, operations will be described. First, housing of the cassette 2 in the cassette storage unit 3 will be explained with reference to FIGS. 7 to 9. As shown in FIG. 7, the cassette 2 located at the movable position B that does not hinder the vertical transfer unit 100 from moving has the groove engaging section 4*a* of the chuck 4 engaged with the groove 2*a* thereof under the urging force of the chuck spring 6. This is the locking position of the chuck 4.

Figure 8:
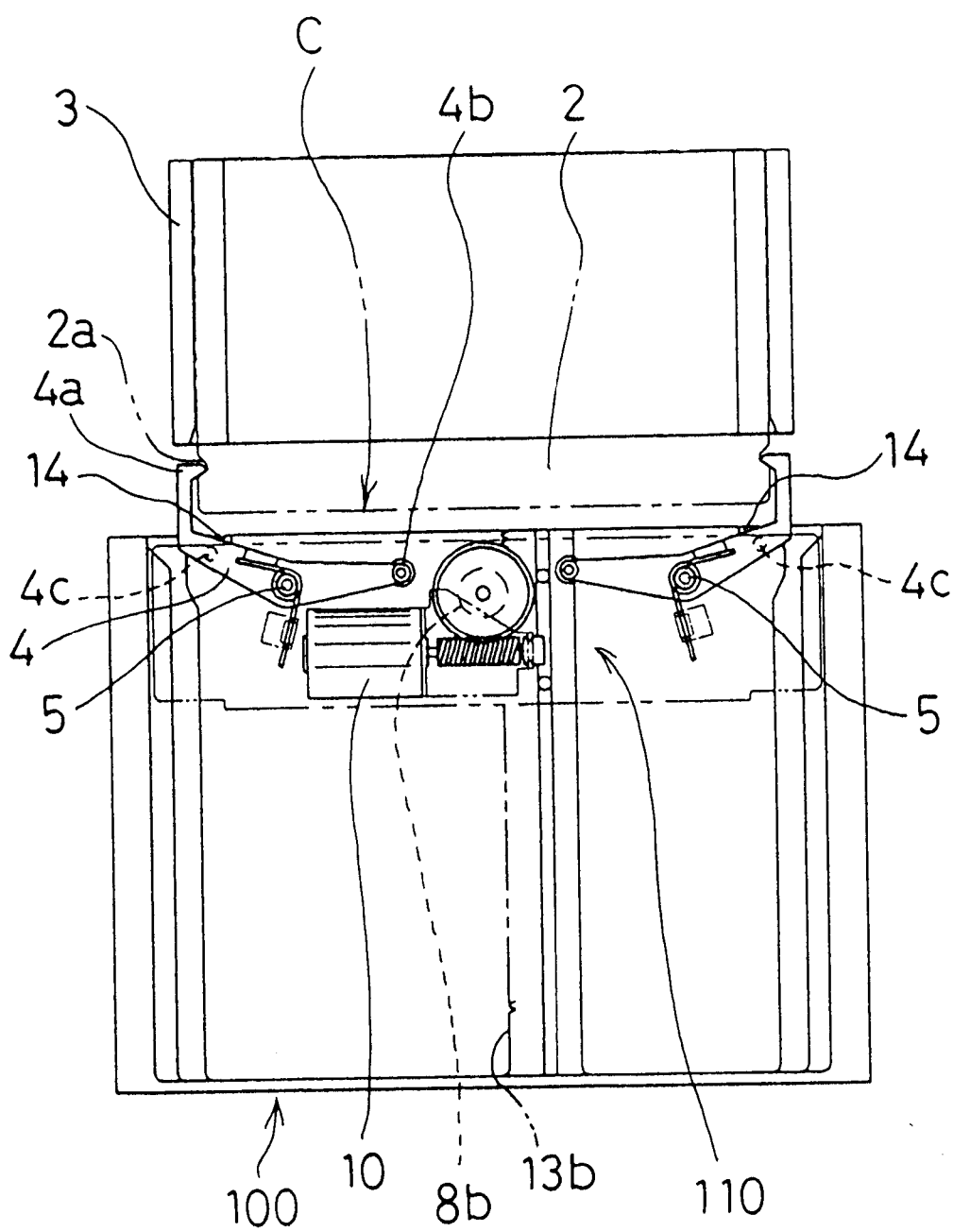
FIG. 8 is a diagram showing a step subsequent to the one in FIG. 7 which is carried out during housing of a cassette in the cassette storage section.

In this state, when the motor 10 rotates, the gear 8 is rotated to allow the drive gear 8*b* and the rack 13*b* to move the horizontal transfer unit 110 to a position C at which the cassette 2 is housed in the cassette storage unit 3, as shown in FIG. 8.

Figure 9:
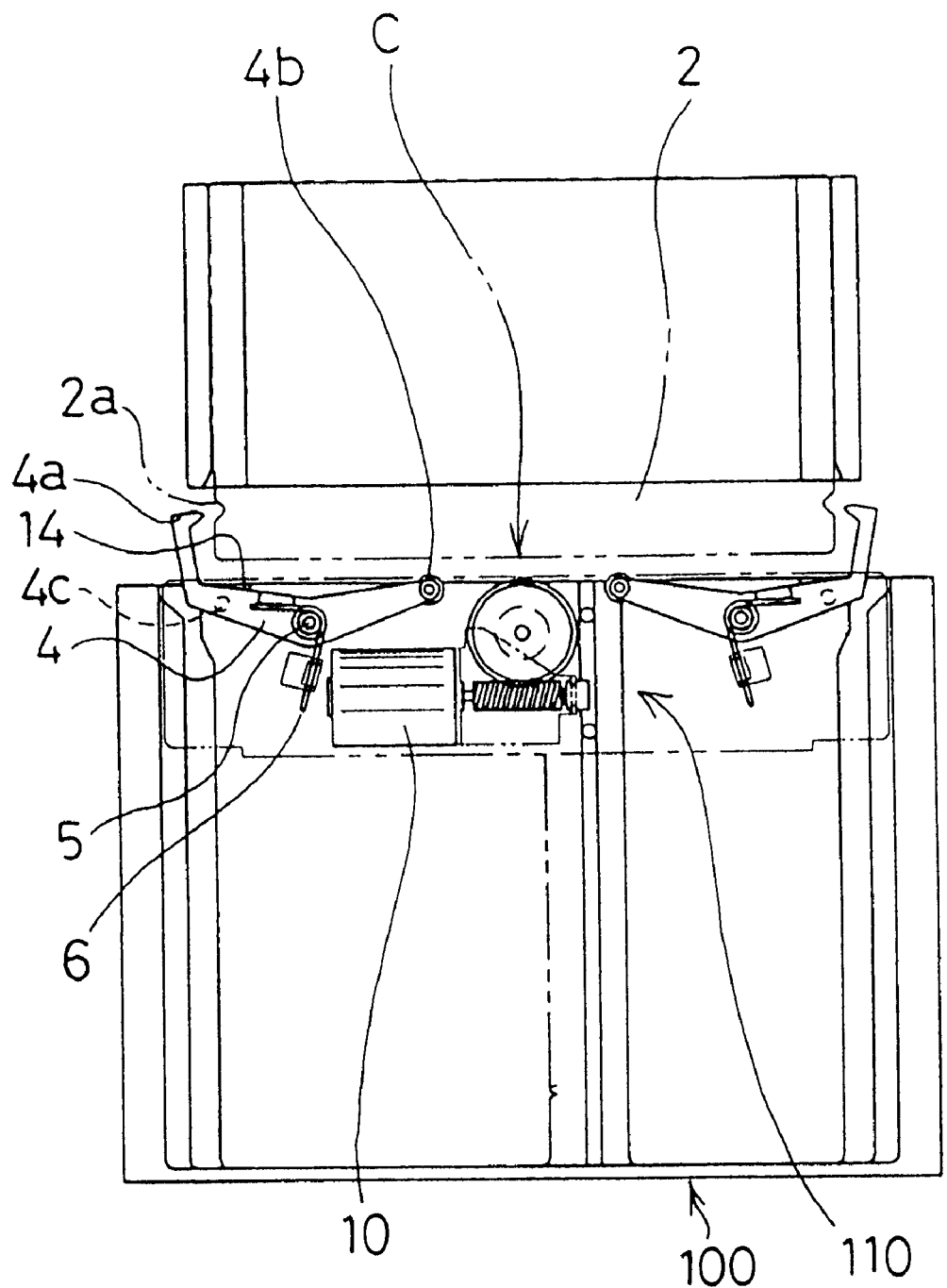
FIG. 9 is a diagram showing a step subsequent to the one in FIG. 8 which is carried out during housing of a cassette in the cassette storage section.

When the motor 10 further rotates, the abutting section 4*c* of the chuck 4 abuts on the chuck releasing member 14 to allow the chuck 4 to rotate around the support shaft 5 against the urging force of the chuck spring 6, so that the chuck 4 moves to a position at which its groove engaging section 4*a* and abutting section 4*b* are prevented from abutting on the cassette 2, as shown in FIG. 9. This is the release position of the chuck 4.

In this manner, the rotation of the motor 10 alone allows the cassette 2 to be transferred from the movable position B to the storage position C and also allows the chuck 4 to move to the release position, whereby the vertical transfer unit 100 gets ready for immediate vertical movement.

Next, removal of the cassette 2 from the cassette storage unit 3 will be described also with reference to FIGS. 7 to 9. When a command for removal of a predetermined cassette 2 is issued, then in the state in FIG. 9, the vertical transfer unit 100 is moved. That is, when the motor 19 (FIGS. 1, 2, and 4) rotates, since the left drive gear 17 and the right drive gear 18 are meshed with the corresponding racks 22*b* of the rack units 22, the vertical transfer unit 100 moves, together with the horizontal transfer unit 110, in a vertical direction of the cassette changer to a position at which the selected cassette 2 can be removed.

In the state shown in FIG. 9, when the motor 10 rotates reversely, the chuck releasing member 14 and the projecting section 4*c* of the chuck 4 are separated from each other as the horizontal transfer means 110 moves away from the cassette storage position 3. Accordingly, the chuck 4 rotates around the support shaft 5 due to the urging force of the chuck spring 6 to engage the groove engaging section 4*a* with the groove 2*a* in the cassette, as shown in FIG. 8.

When the motor 10 further rotates, the horizontal transfer unit 110 transfers the cassette 2 from the storage position C shown in FIGS. 9 and 8 to the movable position B shown in FIG. 7. In this manner, the cassette 2 can be removed from the cassette storage position 3.

Figure 6:
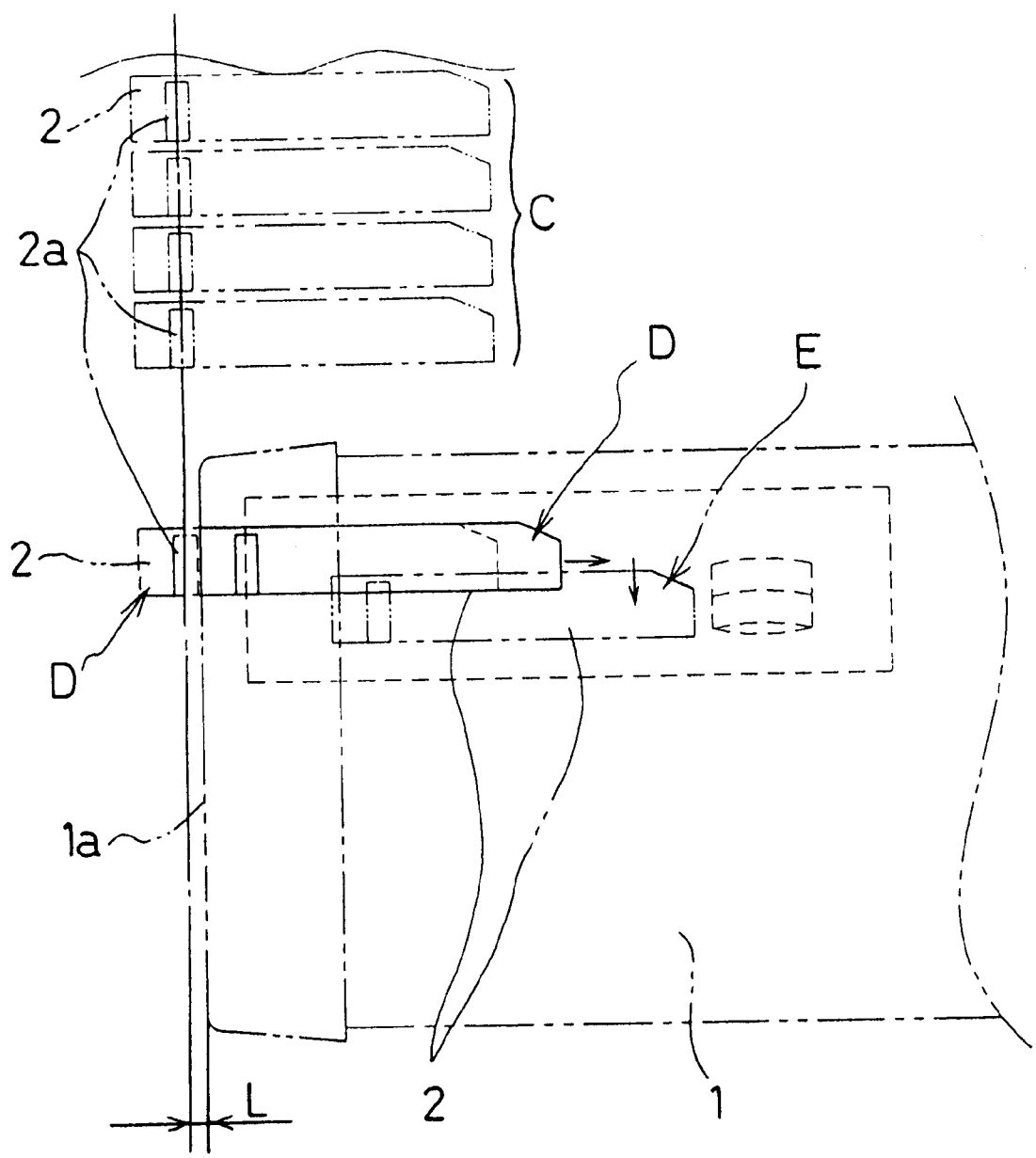
FIG. 6 is a diagram useful in explaining an operation of installing a cassette in a VCR of the cassette changer.
Figure 11:
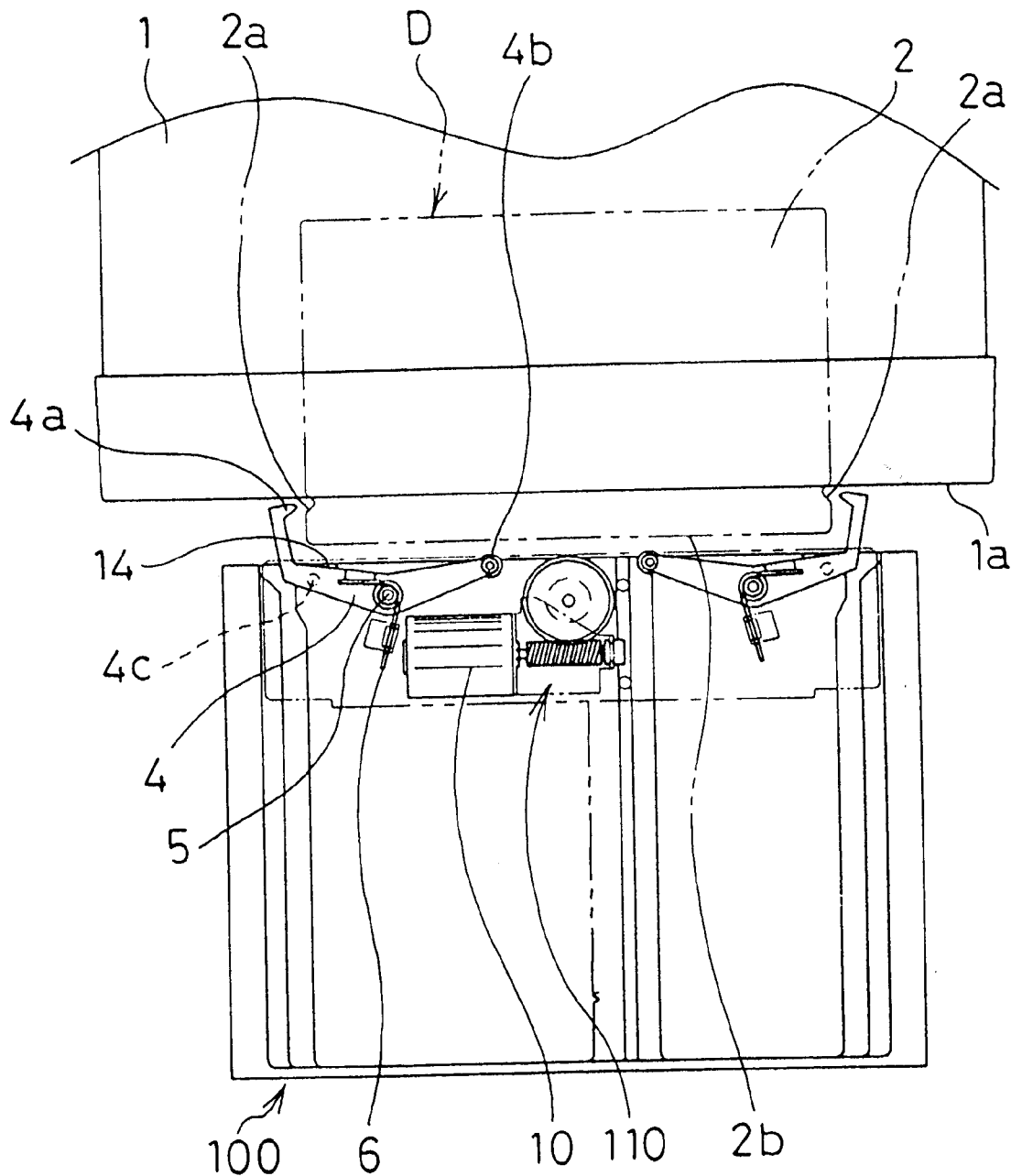
FIG. 11 is a diagram showing a step subsequent to the one in FIG. 10 which is carried out during insertion of a cassette into the VCR.
Figure 12:
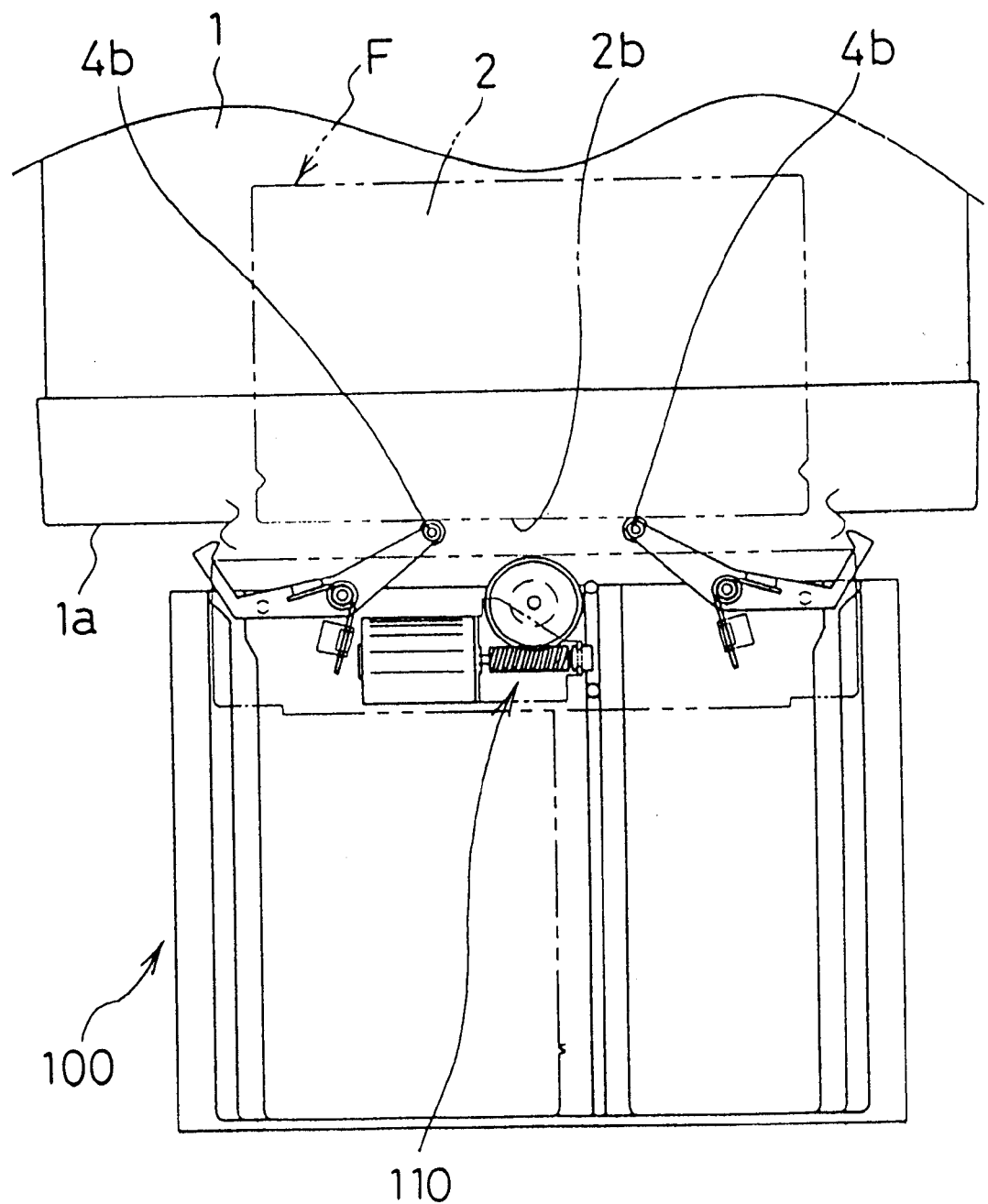
FIG. 12 is a diagram showing a step subsequent to the one in FIG. 11 which is carried out during insertion of a cassette into the VCR.

Next, the operation of inserting the cassette 2 into the VCR 1 will be described with reference to FIGS. 10 to 12. First, insertion and removal of the cassette 2 into and from a general VCR1 will be explained. In the general VCR1, data can be recorded on and reproduced from the cassette 2 at a predetermined installation position E, which is shown in FIG. 6, but when a command for ejection of the cassette 2 is issued, the cassette 2 is ejected from the insert and withdrawal port 1*b* up to the predetermined position D at which the groove 2*a* of the cassette 2 springs out from the front surface 1*a* of the VCR 1. In addition, in inserting the cassette 2 into the VCR 1, the cassette 2 is not automatically installed in the VCR 1 until it is pushed to a suction position F closer to the VCR 1 than the predetermined position D, as shown in FIG. 12.

When the motor 19 (FIGS. 1, 2, and 4) rotates, since the left drive gear 17 and the right drive gear 18 are meshed with the corresponding racks 22*b* of the rack units 22, the cassette 2 and the horizontal transfer unit 110 are moved to the insert and withdrawal port 1*b* of the VCR 1.

Figure 10:
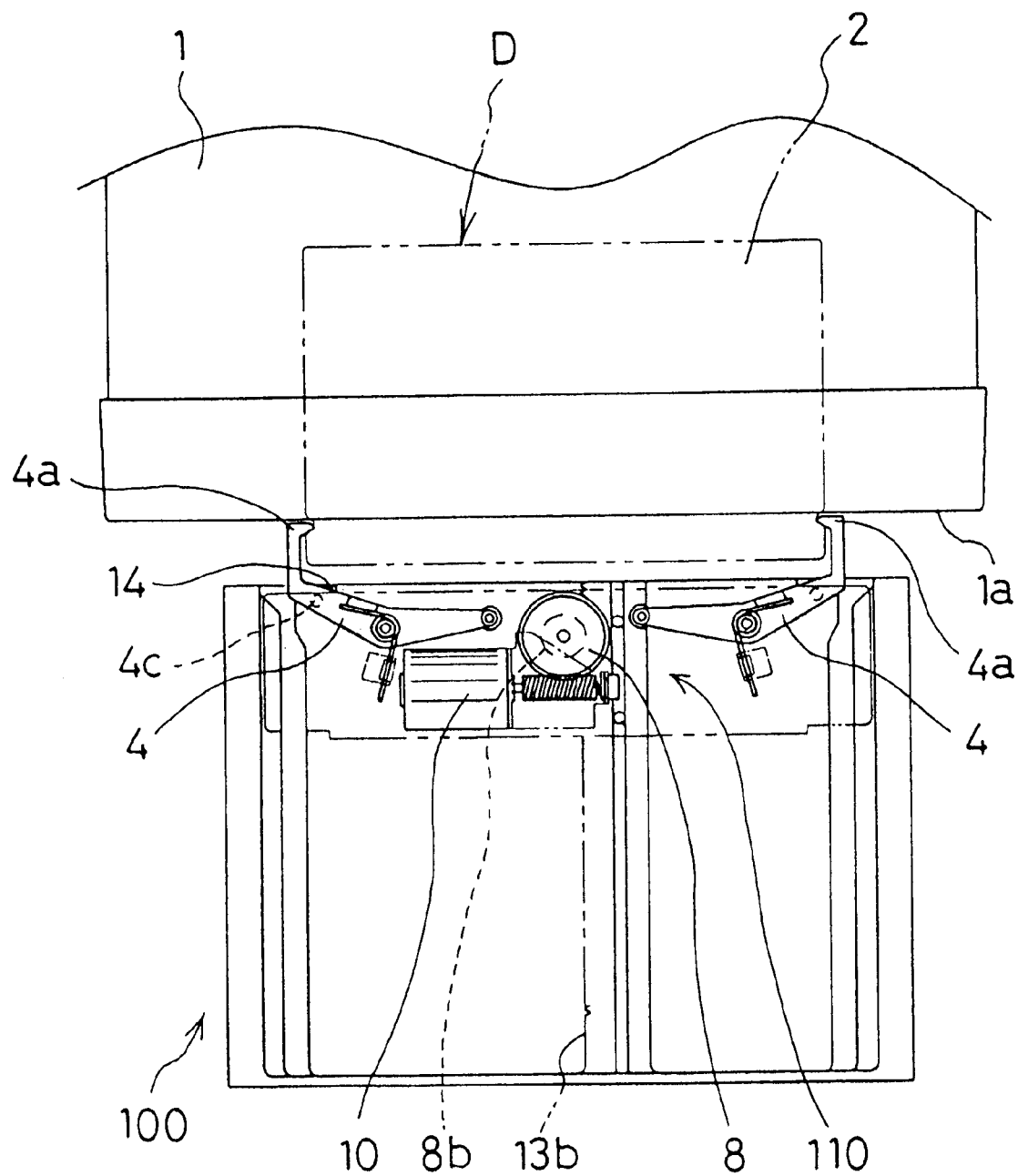
FIG. 10 is a diagram useful in explaining an operation of inserting or removing a cassette into or from the VCR of the cassette changer.

As shown in FIG. 10, in this state, when the motor 10 rotates, the gear 8 is rotated and the horizontal transfer unit 110 allows the drive gear 8*b* and the rack 13*b* to transfer the cassette 2 to the predetermined position D in the insert and withdrawal port 1*b* of the VCR 1.

When the motor 10 further rotates, the projecting section 4*c* of the chuck 4 abuts on the chuck releasing member 14. Thus, as shown in FIG. 11, the chuck 4 rotates around the support shaft 5 against the urging force of the chuck spring 6 and moves beyond the release position to a push-in position at which the groove engaging section 4*a* of the chuck 4 leaves the groove 2*a* of the cassette 2 and at which the abutting section 4*b* abuts on the rear surface 2*b* of the cassette 2 as shown in FIG. 12. Accordingly, the cassette 2 can be pushed into the suction position F shown in FIG. 12. Subsequently, the VCR 1 automatically transfers the cassette 2 to the installation position E for recording or reproduction, as shown in FIG. 6.

Next, removal of the cassette 2 from the VCR 1 will be described also with reference to FIGS. 10 to 12. First, as shown in FIG. 11, the chuck 4 is in the release state and is standing by at the insert and withdrawal port 1*b* of the VCR 1. When an ejection command is issued, the cassette 2 is ejected from the installation position E in the VCR 1 shown in FIG. 6, to the insert and withdrawal position D. When the movement of the cassette 2 to the insert and withdrawal position D is detected, the motor 10 rotates reversely, and the chuck releasing member 14 and the projecting section 4*c* of the chuck 4 are separated from each other as the horizontal transfer unit 110 moves. Accordingly, the chuck 4 rotates around the support shaft 5 due to the urging force of the chuck spring 6 to engage the groove engaging section 4*a* with the groove 2*a* of the cassette 2, as shown in FIG. 10. When the motor 10 further rotates, the horizontal transfer unit 110 transfers the cassette 2 from the insert and withdrawal position D in the insert and withdrawal port 1*b* to the movable position A shown in FIG. 1. In this manner, the cassette 2 can be removed from the VCR 1.

In this case, since a distance L between the groove 2*a* of the cassette 2 located at the insert and withdrawal position D and the front surface 1*a* of the VCR 1 is substantially equal to a distance L between the groove 2a of the cassette 2 located at the storage position C and the front surface 1a of the VCR 1, as described above, the chuck releasing member 14 need not be moved on the vertical transfer unit 100, thereby enabling the above operations to be performed using a simple configuration.

As described above, according to the first embodiment, both horizontal movement of the cassette 2 and releasing of the chuck 4 can be carried out using only the motor 10, thereby simplifying installation and removal of the cassette 2 into and from the storage unit 3 and VCR 1.

(Second Embodiment)

According to the second embodiment, the functions of the above first embodiment are realized using a more simple configuration.

Figure 13:
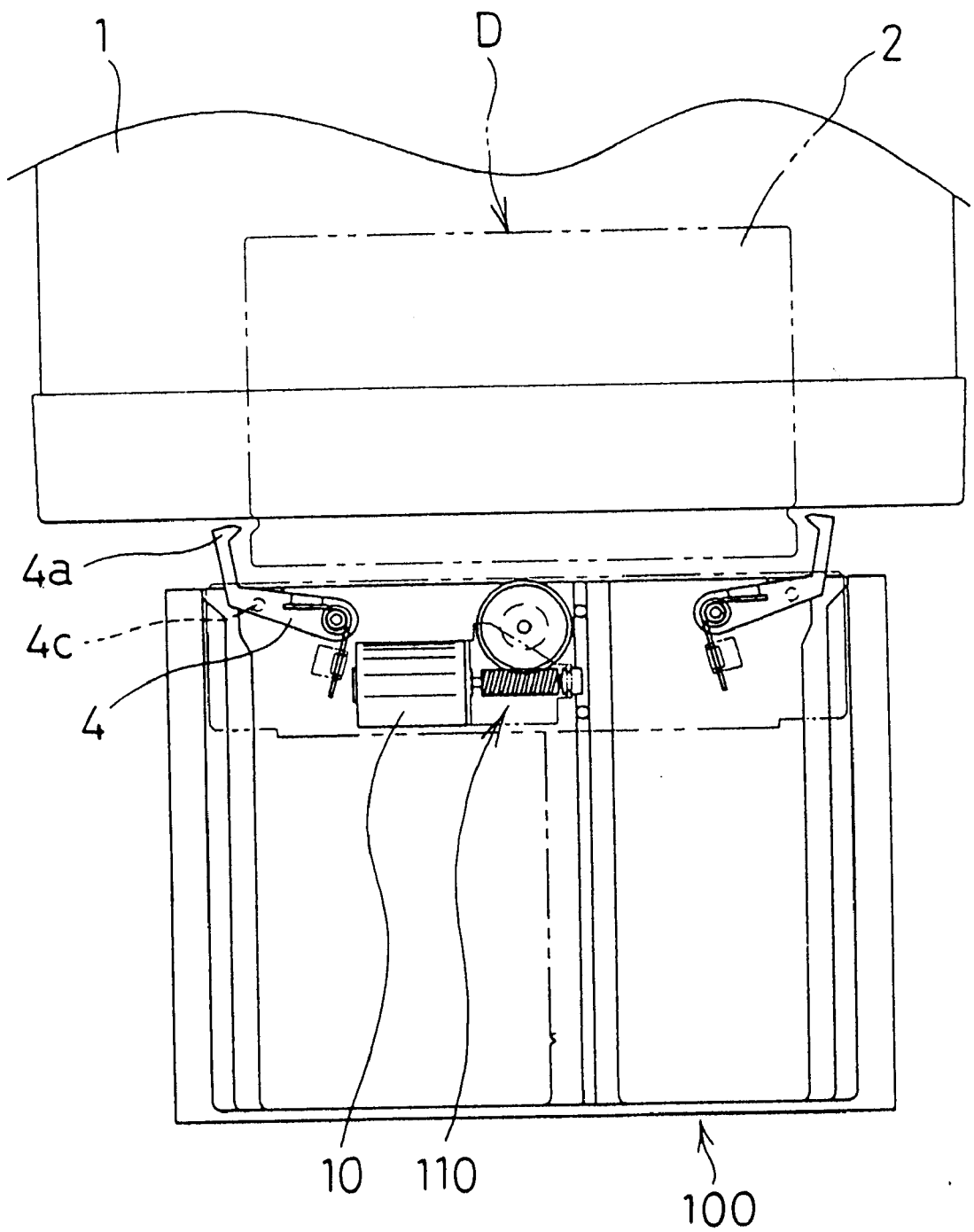
FIG. 13 is a diagram useful in explaining an operation of inserting or removing a cassette into or from a VCR of a cassette changer according to a second embodiment of the present invention.
Figure 14:
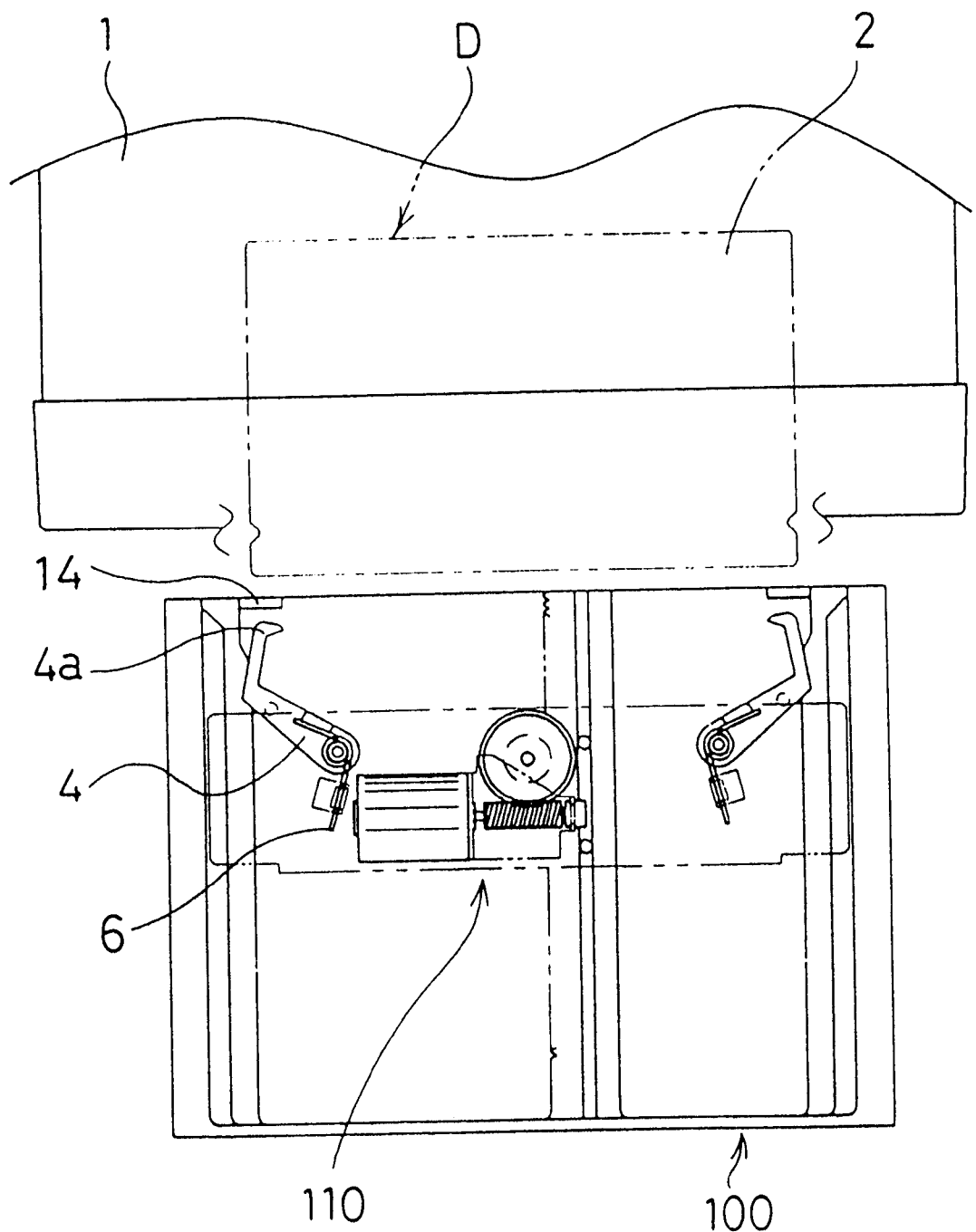
FIG. 14 is a diagram showing a step subsequent to the one in FIG. 13 which is carried out during insertion of a cassette into the VCR.
Figure 15:
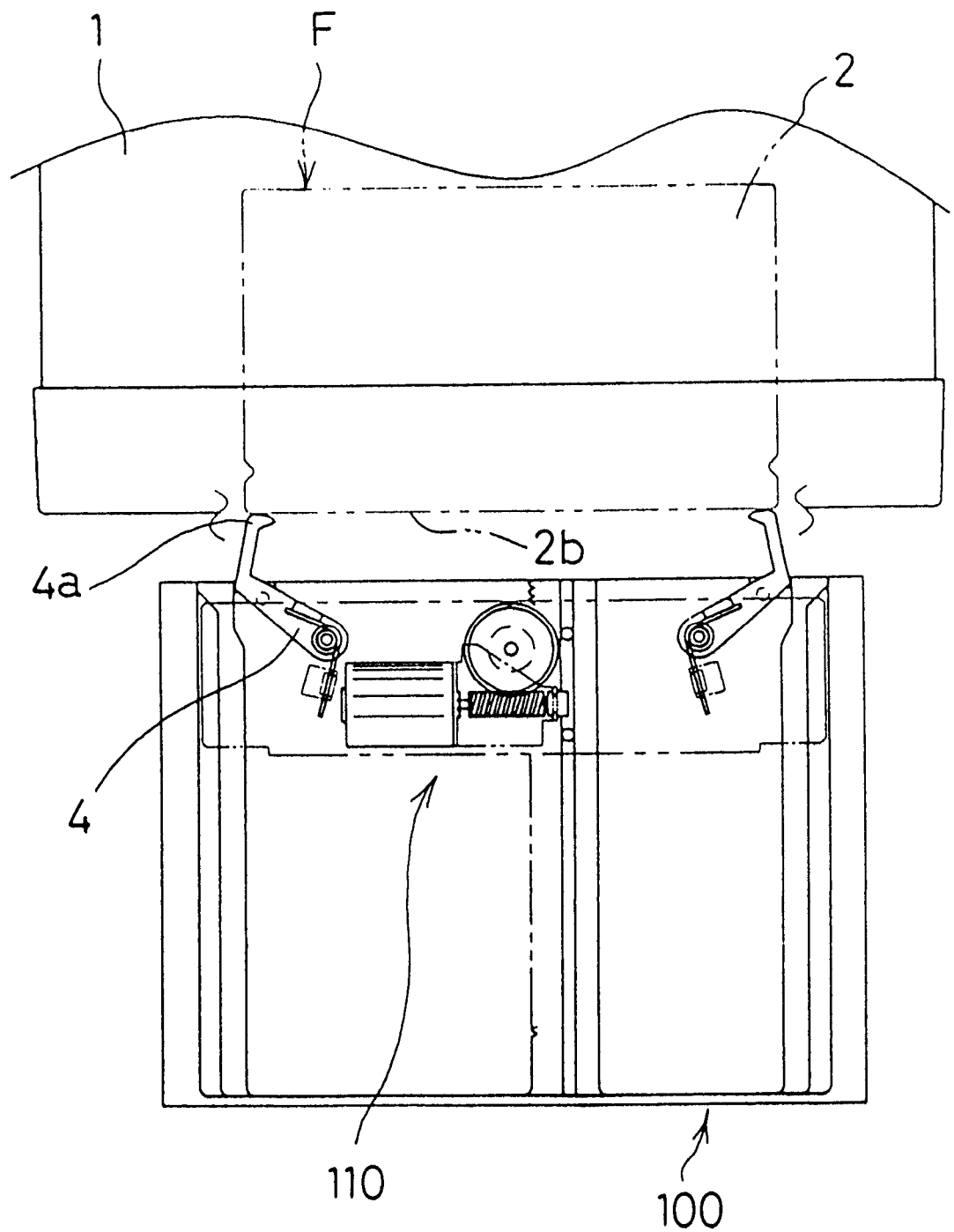
FIG. 15 is a diagram showing a step subsequent to the one in FIG. 14 which is carried out during insertion of a cassette into the VCR.

As shown in FIGS. 13 to 15, the chuck 4 does not include the abutting section 4b as in the first embodiment, and the groove engaging section 4a of the chuck 4 also acts as the abutting section. Consequently, the second embodiment has a very simple configuration. The other configurations are the same as in the first embodiment, and description thereof is omitted.

Next, operations will be described; but only insertion of the cassette 2 into the VCR 1 will be explained. The other operations are the same as in the first embodiment.

When the motor 10 rotates, the cassette 2 is moved from the movable position A shown in FIG. 1 to the insert and withdrawal position D in the insert and withdrawal port 1b of the VCR 1 shown in FIG. 13, and the chuck 4 is subsequently moved to the release position. In this state, the motor 19 shown in FIG. 1 rotates to move, together with the transfer unit 110, the chuck 4 in the vertical direction to a position at which no cassette 2 is present. Next, the motor 10 rotates reversely to move the transfer unit 110 in the horizontal direction, but due to the absence of the cassette 2, the chuck 4, which has been separated from the chuck releasing member 14, has its groove engaging sections 4a significantly closed due to the action of the spring 6 as shown in FIG. 14. Next, the motor 19 rotates to move the chuck 4 of the horizontal transfer device 110 in the vertical direction up to the height of the insert and withdrawal port 1b. Then, when the motor 10 rotates, a side portion of the groove engaging section 4a of the chuck 4 pushes into the VCR 1, the rear surface 2b of the cassette 2 located at the predetermined position D. Consequently, the cassette 2 moves to the suction position F as shown in FIG. 15. As a result, the cassette 2 can be installed in the VCR 1.

As described above, according to the second embodiment, installation and removal of the cassette 1 into and from the storage unit 3 or VCR 1 can be carried out using a more simple configuration than in the first embodiment.

Industrial Applicability

As described above, the cassette changer according to the present invention is suitable for a device for housing a plurality of tape cassettes for a VCR or the like and sequentially operating these cassettes.

What is claimed is:

1. A cassette changer, comprising;
   a recording and reproducing unit having an insert and withdrawal port;
   a storage unit adapted to store a plurality of groove-carrying cassettes therein, in which the cassette changer transfers a cassette between the recording and reproducing unit and the storage unit,
   a first transfer unit for transferring said cassette between a first position from which the cassette can be able to transfer to the insert and withdrawal port of said recording and reproducing unit and a second position from which the casette can be able to transfer to said storage unit;
   a second transfer unit mounted on said first transfer unit for transferring said cassette between a movable position that does not hinder movement of said first transfer unit and a storage position at which the cassette is housed in said storage unit or said insert and withdrawal position at which the cassette is inserted into or withdrawn from the insert and withdrawal port formed in said recording and reproducing unit;
   a chuck mounted on paid second transfer unit and comprising a groove engaging section engaging with the groove of said cassette and an abutting section abutting one side surface of said cassette, the chuck assuming a locking position in which the groove engaging section engages with the groove of said cassette to hold the cassette, a release position in which said groove engaging section leaves the groove of said cassette and in which said chuck does not hinder said first transfer unit from moving, and a push-in position in which said abutting section abuts on one side surface of the cassette to push the cassette into the insert and withdrawal port of the recording and reproducing unit; and
   a chuck releasing member provided on said first transfer unit and allowing said second transfer unit to transfer the cassette to said storage or insert and withdawal position and then further move to abut on said chuck member to move it from the locking position to the release position, the chuck releasing member subsequently moving the chuck from the release position to the push-in position when the second transfer unit further moves.

2. The cassette changer of claim 1, wherein the groove-carrying cassettes housed in the cassette storage device and the groove-carrying cassette that has been ejected to the insert and withdrawal port of the recording and reproducing unit from an interior of the recording and reproducing unit are located at a substantially equal distance from a front surface of said recording and reproducing unit.

3. The cassette changer of claim 1, wherein
   the groove engaging section and abutting section of the chuck are formed of an identical part;
   the cassette changer has a chuck spring that urges the groove engaging section of said chuck to engage with the groove section of the cassette;
   the chuck releasing member moves the chuck from the locking position to the release position against an urging force of said chuck spring;
   the first transfer unit transfers in a transfer direction of the first transfer unit, the second transfer unit, which has the chuck moved to the release position from the locking position by means of the chuck releasing member;
   the second transfer unit, after being transferred in the transfer direction of the first transfer unit, transfers the chuck away from the cassette located at the insert and withdrawal position;
   first transfer means to transfer the second transfer unit along the transfer direction of the first transfer unit in an opposite direction, the second transfer unit transferred the chuck away from the cassette located at the insert and withdrawal position; and
   the chuck spring again urging the chuck, which has been released from abutment on the chuck releasing member when the chuck is transferred away from the cassette by the second transfer unit and transferred in said opposite direction by the first transfer means, to move the abutting section of the chuck to the push-in position opposed to the one side surface of the cassette located at said insert and withdrawal position.

* * * * *